(12) United States Patent
Valentin Chung et al.

(10) Patent No.: US 9,153,803 B2
(45) Date of Patent: Oct. 6, 2015

(54) HIGH TEMPERATURE SEALED ELECTROCHEMICAL CELL

(75) Inventors: Brice Hoani Valentin Chung, Cambridge, MA (US); Paul J. Burke, Framingham, MA (US); Donald R. Sadoway, Cambridge, MA (US)

(73) Assignees: Massachusetts Institute of Technology, Cambridge, MA (US); Total Marketing Services, Puteaux (FR)

( * ) Notice: Subject to any disclaimer, the term of this patent is extended or adjusted under 35 U.S.C. 154(b) by 395 days.

(21) Appl. No.: 13/548,347

(22) Filed: Jul. 13, 2012

(65) Prior Publication Data

US 2014/0014503 A1    Jan. 16, 2014

(51) Int. Cl.

| | |
|---|---|
| *H01M 2/06* | (2006.01) |
| *C25C 7/00* | (2006.01) |
| *H01M 2/04* | (2006.01) |
| *H01M 2/30* | (2006.01) |
| *H01M 10/38* | (2006.01) |
| *H01M 10/39* | (2006.01) |
| *H01M 2/02* | (2006.01) |
| *H01M 2/08* | (2006.01) |
| *H01M 10/34* | (2006.01) |

(52) U.S. Cl.
CPC ............. *H01M 2/0447* (2013.01); *C25C 7/005* (2013.01); *H01M 2/06* (2013.01); *H01M 2/30* (2013.01); *H01M 10/38* (2013.01); *H01M 10/39* (2013.01); *H01M 2/0252* (2013.01); *H01M 2/08* (2013.01); *H01M 10/34* (2013.01); *Y10T 29/49117* (2015.01)

(58) Field of Classification Search
None
See application file for complete search history.

(56) References Cited

U.S. PATENT DOCUMENTS

| | | | | |
|---|---|---|---|---|
| 3,847,675 | A * | 11/1974 | Sharma | 429/112 |
| 3,882,012 | A * | 5/1975 | Dickinson et al. | 204/412 |
| 3,953,227 | A * | 4/1976 | Jones et al. | 429/321 |
| 3,993,653 | A * | 11/1976 | Blum et al. | 204/272 |
| 4,066,826 | A * | 1/1978 | Jones et al. | 429/104 |
| 4,247,381 | A * | 1/1981 | Schirnig et al. | 204/225 |
| 4,945,012 | A * | 7/1990 | Bugga et al. | 429/103 |
| 4,966,823 | A | 10/1990 | Bugga et al. | |
| 5,529,858 | A * | 6/1996 | Wicker et al. | 429/149 |
| 5,573,873 | A * | 11/1996 | Bugga et al. | 429/223 |
| 5,942,097 | A * | 8/1999 | Rapp | 205/386 |
| 6,585,882 | B1 * | 7/2003 | Su et al. | 205/687 |
| 7,857,952 | B2 * | 12/2010 | Yoshida et al. | 204/273 |
| 2003/0190522 | A1 * | 10/2003 | Ogata | 429/179 |
| 2008/0044725 | A1 * | 2/2008 | Sadoway et al. | 429/149 |

FOREIGN PATENT DOCUMENTS

| | | |
|---|---|---|
| GB | 1455031 | 11/1976 |
| GB | 2226441 A | 6/1990 |

OTHER PUBLICATIONS

International Searching Authority—International Search Report—International Application No. PCT/IB2013/001769 dated Nov. 26, 2013, together with the Written Opinion of the International Searching Authority, 9 pages.

* cited by examiner

*Primary Examiner* — Harry D Wilkins, III
(74) *Attorney, Agent, or Firm* — Sunstein Kann Murphy & Timbers LLP

(57) ABSTRACT

A cell for high temperature electrochemical reactions is provided. The cell includes a container, at least a portion of the container acting as a first electrode. An extension tube has a first end and a second end, the extension tube coupled to the container at the second end forming a conduit from the container to said first end. A second electrode is positioned in the container and extends out of the container via the conduit. A seal is positioned proximate the first end of the extension tube, for sealing the cell.

24 Claims, 4 Drawing Sheets

HIGH TEMPERATURE SEALED ELECTROCHEMICAL CELL

STATEMENT REGARDING FEDERALLY SPONSORED RESEARCH OR DEVELOPMENT

This invention was made with government support under Grant No. DE-AR0000047 awarded by the U.S. Department of Energy. The government has certain rights in this invention.

TECHNICAL FIELD

The present invention relates to a sealed container operable at high temperature, and more particularly, to sealing of a high temperature electrochemical cell.

BACKGROUND ART

Applications such as high temperature electrolysis and high temperature batteries include a sealed container to prevent reaction of active materials with air and moisture. Conventional designs attempt to seal the entire battery cell at the container level, thus requiring a high temperature seal. In addition to sealing the cell, the seal also electrically insulates the electrodes (e.g., the top and bottom halves of the container) such that conductive seal materials are prohibited. High temperature seals typically use glass or ceramic and are designed to maintain good sealing at a narrow range of operating temperatures. The glass or ceramic composition is usually tailored to match the thermal expansion of the container material at the targeted operating temperature. As a consequence, high temperature seals are generally limited in terms of thermal cycling.

A previous cell design utilizes low temperature seals by including a large thin flange that limits thermal conduction, as described in U.S. Pat. No. 3,419,432 (Hesson), which is incorporated herein by reference. However, this design has a large area for thermal conduction and is not thermally efficient. Moreover, as the cell of Hesson is scaled to larger sizes, its major thermal conduction area scales with its circumference.

SUMMARY OF THE EMBODIMENTS

In accordance with a first embodiment of the invention there is provided a cell for high temperature electrochemical reactions. The cell includes a container, at least a portion of the container acting as a first electrode. An extension tube has a first end and a second end, the extension tube coupled to the container at the second end forming a conduit from the container to said first end. A second electrode is positioned in the container and extends out of the container via the conduit. A seal is positioned proximate the first end of the extension tube, for sealing the cell.

In accordance with related embodiments of the invention, an electrical insulation sleeve may be positioned between the second electrode and the extension tube. The seal may include an o-ring compression fitting. A tee compression fitting may be positioned between the first end of the extension tube and the o-ring compression fitting. One or more heating elements may be thermally coupled to the container. Thermal insulation may cover at least portions of the heating elements, container and/or the extension tube. A portion of the extension tube may not be thermally insulated. At least one of an electrolyte, a solid metal and a liquid metal may be placed within the container.

In accordance with further related embodiments of the invention, the container may include an insulating sheath within the container and/or an insulating coating on the inner walls of the container. The insulating sheath and/or the insulated coating may have a different corrosion resistance relative to the inner walls of the container, and/or provide electrical insulation. An electrical insulation material may be coupled between the container and the insulating sheath, with the insulating sheath including metal.

In accordance with still further related embodiments of the invention, the extension tube may be removably coupled to the container. A socket compression fitting may be attached to the container, the extension tube removably attachable to the socket compression fitting.

In yet further related embodiments of the invention, the container may include top, bottom and side walls. The extension tube is coupled to a side wall, allowing cells to be stacked on top of each other.

In accordance with another embodiment of the invention, a method of making an electrochemical cell includes filling a container with material for electrolysis, the container including an opening, the container for acting as a first electrode. A second electrode is placed in the container via the opening. A cap is placed over the opening. An extension tube is coupled to the cap, the extension tube having a first end and a second end. The extension tube is coupled to the cap at the second end, forming a conduit from the container to said first end, wherein the top electrode extends out of the container via the conduit. A seal for sealing the cell is installed proximate the first end of the extension tube.

In accordance with related embodiments of the invention, filling the container with material for electrolysis may be via the opening, prior to placement of the cap. Alternatively, filling the container with material for electrolysis may be via the extension tube, subsequent to placement of the cap.

In further related embodiments of the invention, an electrical insulation sleeve may be provided between the second electrode and the extension tube. The seal may include an o-ring compression fitting, with a tee compression fitting positioned between the first end of the extension tube and the o-ring compression fitting. One or more heating elements may be thermally coupled to the container. Portions of the heating elements, the container and the extension tube may be covered with thermal insulation.

In still further related embodiments of the invention, an insulating sheath within the container and/or an insulating coating on the inner walls of the container may be provided. An electrical insulation material may be coupled between the container and the insulating sheath, wherein the insulating sheath includes metal. A socket compression fitting may be attached to the cap, such that the extension tube can be removably attached from the socket compression fitting.

In yet further embodiments of the invention, the container may include top, bottom and side walls, wherein the extension tube is coupled to a side wall, allowing the a plurality of the electrochemical cells to be stacked on top of each other.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments of the invention, a sealed container for high temperature applications, such as electrochemical cell, is presented. Generally, in various embodiments of the invention, the electrochemical cell allows for the use of ordinary low temperature seals by separating the seal from the container with an extension tube of sufficient length and minimal wall thickness. Heat transfer across the extension tube is low, and reduced temperatures are achieved at the area of the seal. The low temperature allows the use of common elastomeric seals. In addition, decoupling the seal from the container results in a much smaller sealing area. Overall, the greatly reduced sealing area and the use of reliable elastomeric seals results in a high quality seal. Embodiments of the invention were operated as a liquid metal battery in ambient air and showed no signs of deterioration for greater than 30 days. Details are described below.

Figure 1:
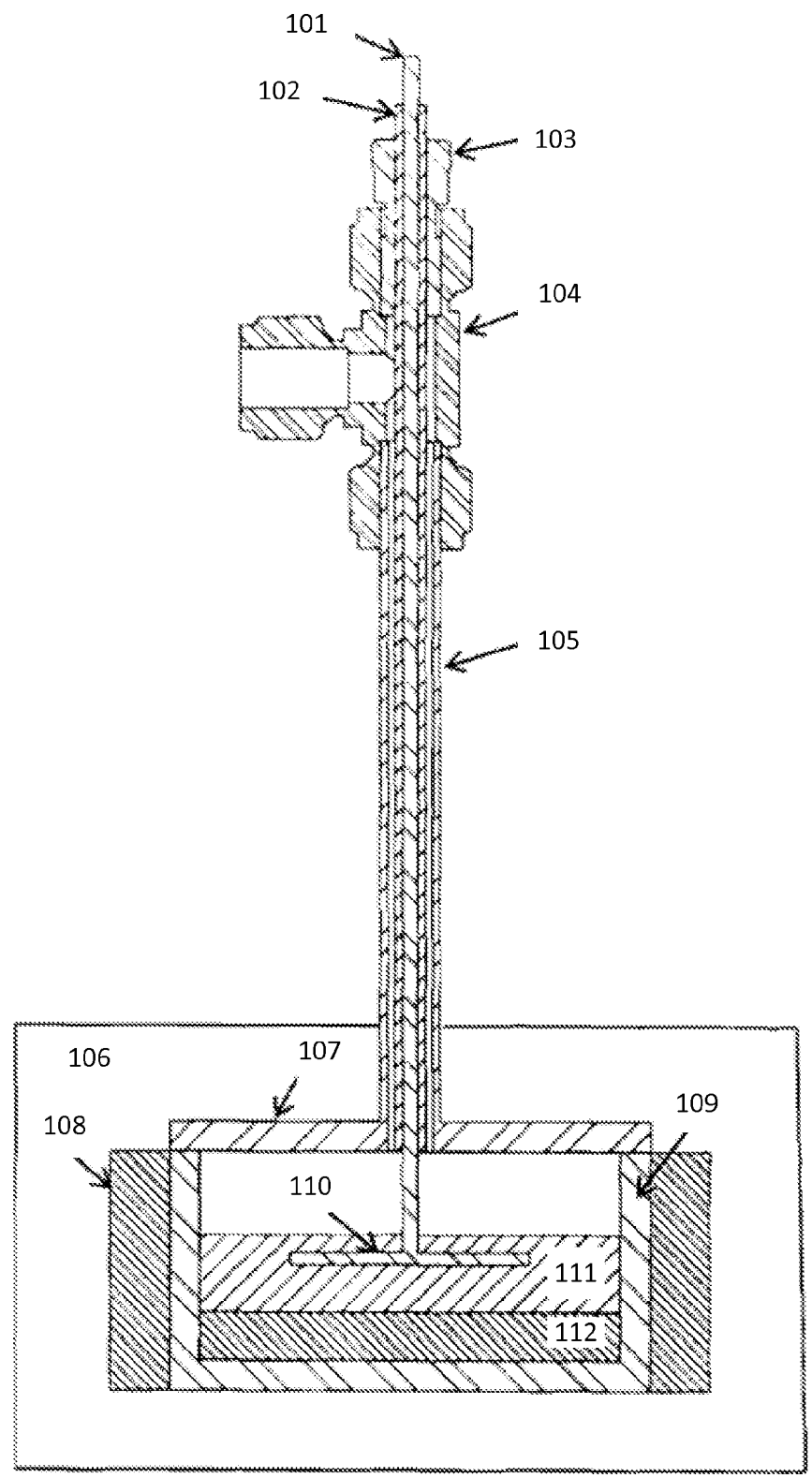
FIG. 1 shows a cross section of an electrochemical cell, in accordance with an embodiment of the invention.

FIG. 1 shows a cross section of an electrochemical cell, in accordance with an embodiment of the invention. The cell includes an electronically conductive container 109 that acts as a first electrode. The shape of the container 109 is not restricted in geometry, and may be, for example, circular, rectangular, or elliptical in nature. The container 109 is generally made of a material having the requisite mechanical strength, and resistance to chemical attack from electrolysis.

The container 109 is filled with a solid or liquid material for electrolysis. Illustratively, the electrolysis material may include, without limitation, an electronically conductive solid or liquid metal or alloy 112, and an ionically conductive electrolyte 111.

A second electrode 110 is positioned in the container 109. A top cap 107 with extension tube 105 may then be fitted to the container 109 cell by, without limitation, welding, brazing or swaging. The extension tube 105 has a first end and a second end, with the second end of the extension tube 105 coupled to the cap 107, forming a conduit from the container 109 to the first end. The second electrode 110 positioned in the container 109 extends out of the container 109 via the conduit.

It is to be understood that the order of steps for producing the electrochemical cell may vary. For example, in various embodiments, if the material for electrolysis is sensitive to air or moisture, the top electrode 110 may first be placed into the container 109. The top cap 107 with extension tube 105 may then be attached to the container 109, followed by loading the electrolysis material through the extension tube 105 under a suitable atmosphere.

In various embodiments, a tee compression fitting 104 may be coupled to extension tube 105. The horizontal opening of the tee compression fitting 104 can be used, for example, to evacuate or fill gases in the interior of the container 109, or for adding additional material to the container 109.

Electrical isolation of the top electrode 110 from the bottom electrode/container 109 may be accomplished with an electrically insulating sleeve 102. The electrically insulating sleeve 102 electrically separates the top electrode connection 101 from the extension tube 105 and any compression fittings 104, which are in electrical contact with the bottom electrode/bottom container 109.

External heating elements 108 may be attached to the container 109. Thermal insulation may cover at least portions of the heating elements 108, container 109 and/or the extension tube 105.

In illustrative embodiments of the invention, a seal 103 is mounted at or proximate the second end (i.e., the distal end relative to the container 109) of the extension tube 105, and fully seals the cell. The seal 103 may be, without limitation, an o-ring compression fitting. An ordinary low temperature elastomeric seal 103 known in the art may advantageously be utilized, as the seal 103 is separated from the container 109 and its associated high temperatures by the extension tube 105. A sufficient length of the extension tube 105 may be left uninsulated to allow for a sufficiently low temperature at the seal 103. The diameter and wall thickness of the extension tube 105 may be kept minimal to reduce conductive heat loss from the container 109.

Separating the seal 103 from the container 109, along with electrically isolating the second electrode 110 from the first electrode/container 109, allows the top cap 107 to be coupled to the container 109 without concern for electrical isolation, thermal expansion or thermal cycling. The top cap 107 may be simply coupled to the container 109 by welding, brazing or swaging, as described above.

Another benefit of decoupling the seal 103 from the container 109 via the extension tube 105 is that a much smaller sealing area may be required, compared to previous cell designs. The size of the container 109 may be increased while keeping the extension tube 105 to the original dimensions, allowing for large cell capacity while retaining a small sealing area and low heat (increasing cell performance at larger scales). Compared to the cell design of Hesson described above, embodiments of the present invention have demonstrated a 10 fold decrease in heating power consumption, and decreased the sealing circumference by a factor of 38 at tested scales.

Figure 2:
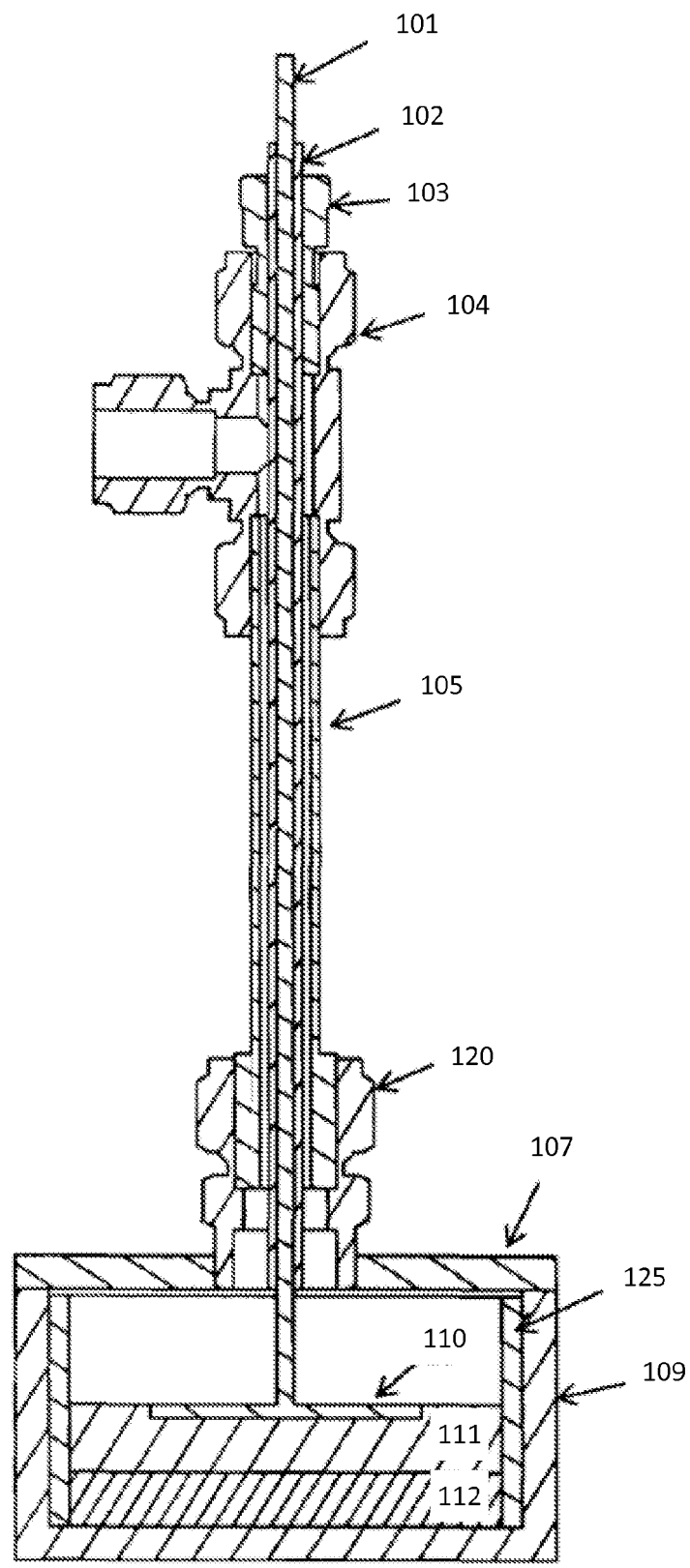
FIG. 2 shows the electrochemical cell of FIG. 1 with an insulating sheath and a socket welded compression fitting, in accordance with various embodiments of the invention.

FIG. 2 shows the electrochemical cell of FIG. 1 with an insulating sheath 125 added inside the bottom electrode container 109 and a socket welded compression fitting 120, in accordance with various embodiments of the invention. The sheath 125 and compression fitting 120 need not be used in combination, but both are shown together in FIG. 2. Illustratively, the material of the sheath 125 may advantageously be chosen to have better corrosion resistance than the container 109. A sheath material that is non-electrically conductive will also allow the cell to be used for battery applications, which add a second electrically conductive layer above the salt that must be kept insulated from the bottom electrode. The sheath 125 may be a separate solid part, and/or a coating on the interior walls of the bottom electrode 109. The addition of the socket welded compression fitting 120 allows a larger passageway for loading material with the extension tube 105 removed.

Figure 3:
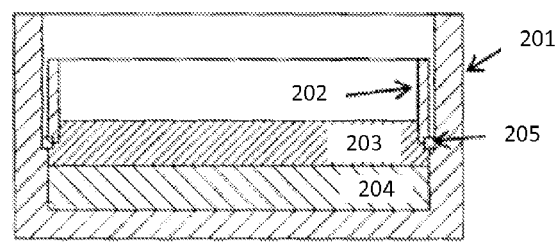
FIG. 3 shows a sheath that includes and/or is attached to various materials having, without limitation, different corrosion resistances and/or electrical characteristics, in accordance with an embodiment of the invention.

FIG. 3 shows a sheath 202 that includes and/or is attached to various materials having, without limitation, different corrosion resistances and/or electrical characteristics, in accordance with an embodiment of the invention. For example, the sheath 202 may be attached to an electrically insulating ring 205 that separates the sheath 202 from the bottom electrode 201, therefore allowing the use of metallic sheaths. The bottom electrode container 201 material may be chosen to resist corrosion from the bottom metal 204 and salt 203, while the sheath 202 may be chosen to resist corrosion by the salt 203 (and top metal in the case of a liquid metal battery). As metals are typically less expensive than ceramics, by utilizing a metallic sheath and minimizing the size of the insulating (ceramic) ring 205, lower cost may be realized.

Figure 4:
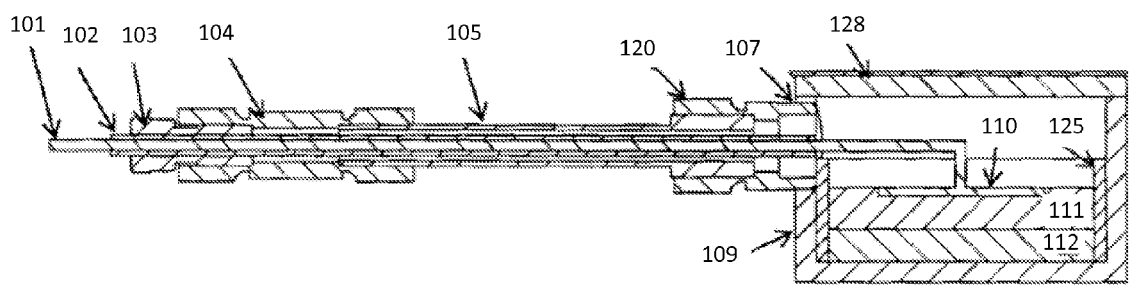
FIG. 4 shows an electrochemical cell that allows for stacking, in accordance with an embodiment of the invention.
Figure 5:
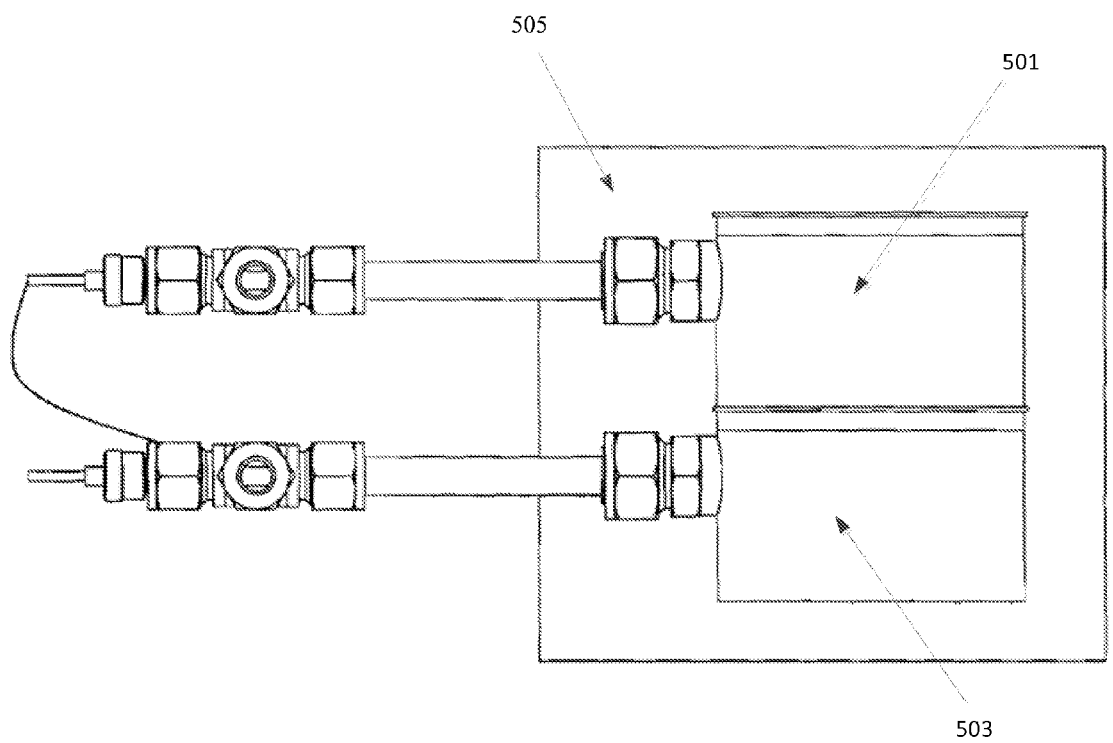
FIG. 5 shows stacking of a plurality of the electrochemical cells of FIG. 4, in accordance with an embodiment of the invention.

FIG. 4 shows an electrochemical cell that allows for stacking, while FIG. 5 shows stacking of a plurality of the electrochemical cells of FIG. 4, in accordance with various embodiments of the invention. A combination of cells 501 and 503 can be used to increase the voltage (connected in series, as shown in FIG. 5) or the current capacity (connected in parallel) in battery applications. Cell stacking can greatly simplify battery construction and further improve the thermal efficiency of the device. Illustratively, the components of the electrochemical cells 501 and 503 may be the same as of FIG. 2, with the exception of the extension tube 105 now exiting the side of the container 109. An electrically insulated holder may be added to enhance mechanical support of the top electrode from the cap. An electrical insulating layer 128 may be used to separate each cell, with electrical connections made, for example, at the end of the extension tubes 105. Instead of thermal insulating each of the cells 501 and 503 individually, thermal insulation 505 may be placed around the plurality of stacked cells 501 and 503.

The extension tube in this invention allows for minimal thermal loss, and high thermal efficiency. Because of its superior thermal efficiency, the possibility of self-heating by means of joule heating can occur at much smaller scales than for previous cell design (Hesson, 1968). This can be a benefit to the overall system efficiency as heating is provided by waste heat generated by the passage of current through the electrolyte, instead of external heating devices.

An important benefit of joule heating is that heat is generated at the center of the cell, and careful control of current can allow a frozen wall of electrolyte to form at the sides of the cell container. Frozen electrolyte is much less corrosive than in its liquid form and can offer a protective layer for the container against corrosion (this feature can be decisive in some electrolysis processes).

Applications of embodiments of the invention include any electrochemical process. Unlike conventional designs, embodiments of the invention may be built using standard parts, leading to decreased complexity and increased effectiveness. The advantageous geometry of the above-described embodiments of the invention also increase the thermal efficiency as the cell is scaled up. This may be particularly advantageous for industrial applications. Exemplary applications where its design features are particularly attractive include, without limitation, electrolysis and electro-refining of reactive materials, high temperature electrolysis and electro-refining, molten salt and molten oxide electrolysis, fuel cells and batteries (e.g. liquid metal batteries).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A cell for high temperature electrochemical reactions, the cell comprising:
a container, at least a portion of the container acting as a first electrode;
an extension tube having a first end and a second end, the extension tube coupled to the container at the second end, forming a conduit from the container to the first end, the extension tube configured to reduce conductive heat loss from the container;
a second electrode positioned in the container and extending out of the container via the conduit;
an ionically conductive liquid electrolyte positioned within the container and in contact with the first electrode and the second electrode; and
an elastomeric seal positioned proximate the first end of the extension tube, for sealing the cell.

2. The cell according to claim 1, further including an electrical insulation sleeve between the second electrode and the extension tube.

3. The cell according to claim 1, wherein the elastomeric seal includes an o-ring compression fitting.

4. The cell according to claim 3, further including a tee compression fitting positioned between the first end of the extension tube and the o-ring compression fitting.

5. The cell according to claim 1, further including one or more heating elements thermally coupled to the container.

6. The cell according to claim 5, further including thermal insulation for covering at least a portion of the one or more heating elements, the container, the extension tube, or combinations thereof.

7. The cell according to claim 6, wherein a portion of the extension tube is not thermally insulated.

8. The cell according to claim 1, wherein the extension tube is removably coupled to the container.

9. The cell according to claim 1, wherein the container includes top, bottom and side walls, and wherein the extension tube is coupled to a side wall, allowing cells to be stacked on top of each other.

10. The cell according to claim 1, further comprising a solid metal, a liquid metal, or combinations thereof, within the container.

11. A cell for high temperature electrochemical reactions, the cell comprising:
a container having an insulating sheath within the container, an insulating coating on the inner walls of the container, or both, at least a portion of the container acting as a first electrode;
an extension tube having a first end and a second end, the extension tube coupled to the container at the second end, forming a conduit from the container to the first end, the extension tube configured to reduce conductive heat loss from the container;
a second electrode positioned in the container and extending out of the container via the conduit;
an ionically conductive electrolyte positioned within the container and in contact with the first electrode and the second electrode; and
an elastomeric seal positioned proximate the first end of the extension tube, for sealing the cell.

12. The cell according to claim 11, wherein the insulating sheath, the insulating coating, or both have a different corrosion resistance relative to the inner walls of the container.

13. The cell according to claim 11, wherein the insulating sheath, the insulating coating, or both provide electrical insulation.

14. The cell according to claim 11, further comprising an electrical insulation material coupled between the container and the insulating sheath, and wherein the insulating sheath includes metal.

15. A cell for high temperature electrochemical reactions, the cell comprising:
a container, at least a portion of the container acting as a first electrode;

an extension tube having a first end and a second end, the extension tube coupled to the container at the second end, forming a conduit from the container to the first end;

a second electrode positioned in the container and extending out of the container via the conduit;

a seal positioned proximate the first end of the extension tube, for sealing the cell; and a socket compression fitting attached to the container, the extension tube removably attachable to the socket compression fitting.

16. A method of making an electrochemical cell, the method comprising:

filling a container with material for electrolysis, the container including an opening, at least a portion of the container acting as a first electrode;

placing a second electrode in the container via the opening;

placing an ionically conductive liquid electrolyte within the container and in contact with the first electrode and the second electrode;

placing a cap over the opening, an extension tube coupled to the cap, the extension tube having a first end and a second end, the extension tube coupled to the cap at the second end, forming a conduit from the container to the first end, the extension tube configured to reduce conductive heat loss from the container, wherein the second electrode extends out of the container via the conduit; and installing an elastomeric seal proximate the first end of the extension tube, for sealing the cell.

17. The method of claim 16, wherein filling the container with material for electrolysis is via the opening, prior to placement of the cap.

18. The method of claim 16, wherein filling the container with material for electrolysis is via the extension tube, subsequent to placement of the cap.

19. The method according to claim 16, further including providing an electrical insulation sleeve between the second electrode and the extension tube.

20. The method according to claim 16, wherein the elastomeric seal includes an o-ring compression fitting, the method further comprising providing a tee compression fitting positioned between the first end of the extension tube and the o-ring compression fitting.

21. The method according to claim 16, wherein the container includes top, bottom and side walls, and wherein the extension tube is coupled to a side wall, the method further including:

stacking a plurality of the electrochemical cells on top of each other.

22. A method of making an electrochemical cell, the method comprising:

filling a container with material for electrolysis, the container including an opening and having (1) an insulating sheath within the container, (2) an insulating coating on the inner walls of the container, or (3) both, at least a portion of the container acting as a first electrode;

placing a second electrode in the container via the opening;

placing an ionically conductive electrolyte within the container and in contact with the first electrode and the second electrode;

placing a cap over the opening, an extension tube coupled to the cap, the extension tube having a first end and a second end, the extension tube coupled to the cap at the second end, forming a conduit from the container to the first end, the extension tube configured to reduce conductive heat loss from the container, wherein the second electrode extends out of the container via the conduit; and installing an elastomeric seal proximate the first end of the extension tube, for sealing the cell.

23. The method according to claim 22, further including providing an electrical insulation material coupled between the container and the insulating sheath, wherein the insulating sheath includes metal.

24. A method of making an electrochemical cell, the method comprising:

filling a container with material for electrolysis, the container including an opening, at least a portion of the container acting as a first electrode;

placing a second electrode in the container via the opening;

placing a cap over the opening, an extension tube coupled to the cap, the extension tube having a first end and a second end, the extension tube coupled to the cap at the second end, forming a conduit from the container to the first end, wherein the second electrode extends out of the container via the conduit;

installing a seal proximate the first end of the extension tube, for sealing the cell;

providing a socket compression fitting attached to the cap;

attaching the extension tube to the socket compression fitting; and removing the extension tube from the socket compression fitting.

* * * * *